United States Patent

Chervenak

[11] 4,205,705
[45] Jun. 3, 1980

[54] OPERATING STRUCTURE FOR A BRAKE VALVE CONSTRUCTION

[75] Inventor: Paul R. Chervenak, Warren, Mich.

[73] Assignee: Massey-Ferguson Inc., Detroit, Mich.

[21] Appl. No.: 920,757

[22] Filed: Jun. 30, 1978

[51] Int. Cl.² ............................................. F16K 31/62
[52] U.S. Cl. ...................................... 137/637; 74/110; 251/279; 251/295
[58] Field of Search ........................ 137/637, 353, 354; 251/229, 279, 295; 74/474, 478, 512, 110

[56] References Cited

U.S. PATENT DOCUMENTS

| | | | |
|---|---|---|---|
| 1,929,522 | 10/1933 | Schulte | 251/295 X |
| 2,166,866 | 7/1939 | Hansen | 137/353 X |
| 2,888,285 | 5/1959 | Gerwig | 251/279 X |
| 3,827,765 | 8/1974 | Husted | 303/6 R X |

Primary Examiner—Alan Cohan
Assistant Examiner—Richard Gerard
Attorney, Agent, or Firm—John C. Thompson

[57] ABSTRACT

Linkage which extends between right and left brake pedals and a valve construction provided with an outwardly extending shiftable shaft and a pair of valves disposed to either side of the shaft. A bolt assembly passes through one end of the shaft and mounts a yoke for rocking movement, the yoke having ends equally offset from the valves. Right and left substantially identical linkages are employed, each linkage including a push rod mounted for limited adjustable sliding movement in a trunnion carried by a bifurcated arm of a bell crank. The other bell crank arm is connected to an end of the yoke by a ball joint assembly, one end of a tubular intermediate portion being adapted to bear against a valve.

9 Claims, 4 Drawing Figures

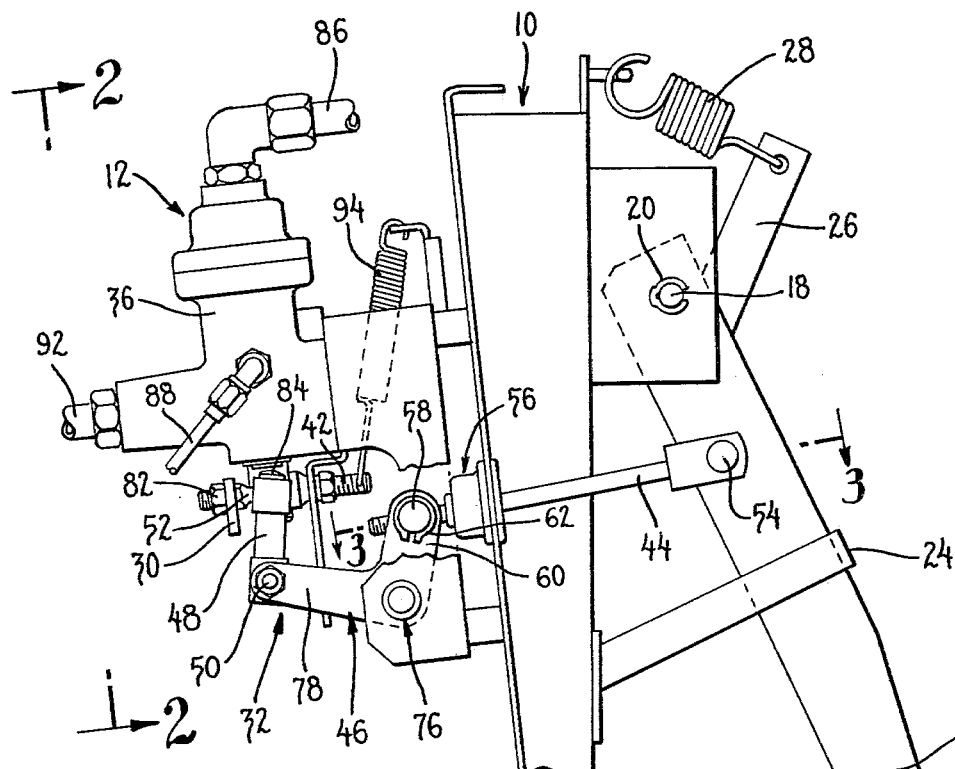
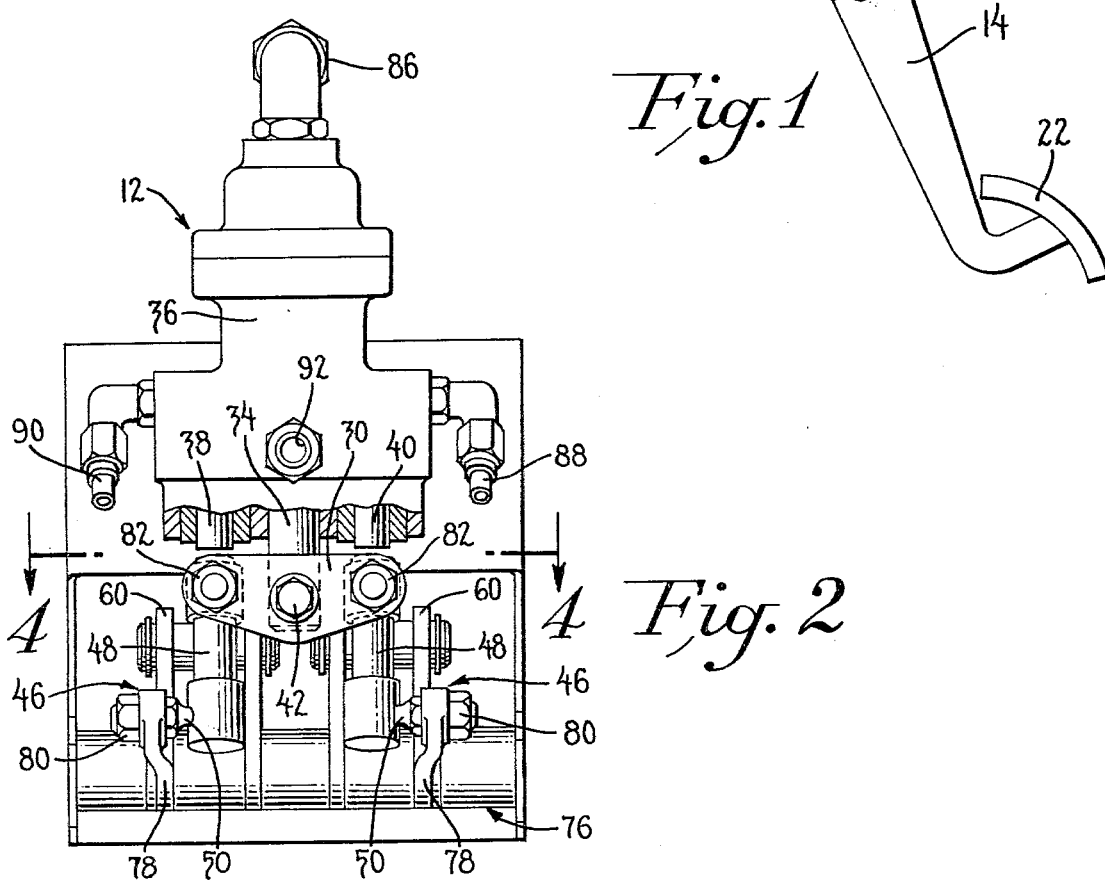

OPERATING STRUCTURE FOR A BRAKE VALVE CONSTRUCTION

FIELD OF THE INVENTION

The present invention relates generally to linkage for a brake valve construction, and more particularly to linkage for operating a brake valve construction of the type shown in U.S. Pat. No. 3,827,765, which valve construction is capable of selectively operating left or right brake upon actuation of left or right poppet valves, or both left and right brakes upon actuation of both poppet valves.

BACKGROUND ART

U.S. Pat. No. 3,827,765 issued Aug. 6, 1974 to Royce H. Husted discloses a brake valve construction and its associated operating linkage in somewhat schematic form. Various difficulties have been found in putting into practice the linkage disclosed in said patent. For example, it is rather difficult to obtain and maintain the desired tolerances between the various parts for the proper operation of the right and left valve poppets in the brake valve construction while maintaining the desired brake pedal free play.

OBJECTS AND SUMMARY OF THE INVENTION

It is an object of the present invention to overcome the disadvantages of the linkage construction shown in the foregoing patent.

More particularly, it is an object of the present invention to provide a linkage construction which can be readily assembled from various non-precision parts, which can be easily adjusted to desired tolerances, and which can maintain desired tolerances.

The above objects and various other objects which will be apparent to those skilled in the art are accomplished by providing a linkage assembly for each brake pedal which includes a push link, a bell crank, and a ball joint assembly. One end of the push link is interconnected to an associated brake pedal and the other end of the push link is received for limited sliding motion by one end of the bell crank. The other end of the bell crank is interconnected to a yoke carried by a shaft which projects outwardly of the valve body by the ball joint assembly. The ball joint assembly includes an intermediate tubular member which is adapted to bear directly upon one of the valve poppets of the brake valve construction during operation of a brake pedal. Other details of the linkage construction will be described in detail below.

BRIEF DESCRIPTION OF THE DRAWINGS

FIG. 1 is a left side view of a portion of a tractor in which the principles of the present invention have been incorporated.

FIG. 2 is a front view of a portion of the structure shown in FIG. 1, this view being taken along the line 2—2.

DETAILED DESCRIPTION

Figure 3:
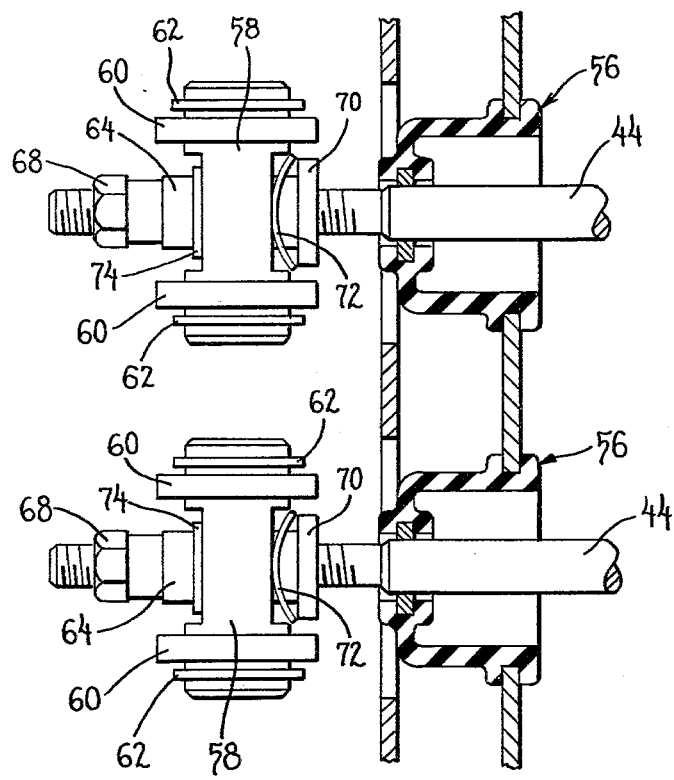
FIG. 3 is a section taken generally along the line 3—3 in FIG. 1.
Figure 4:
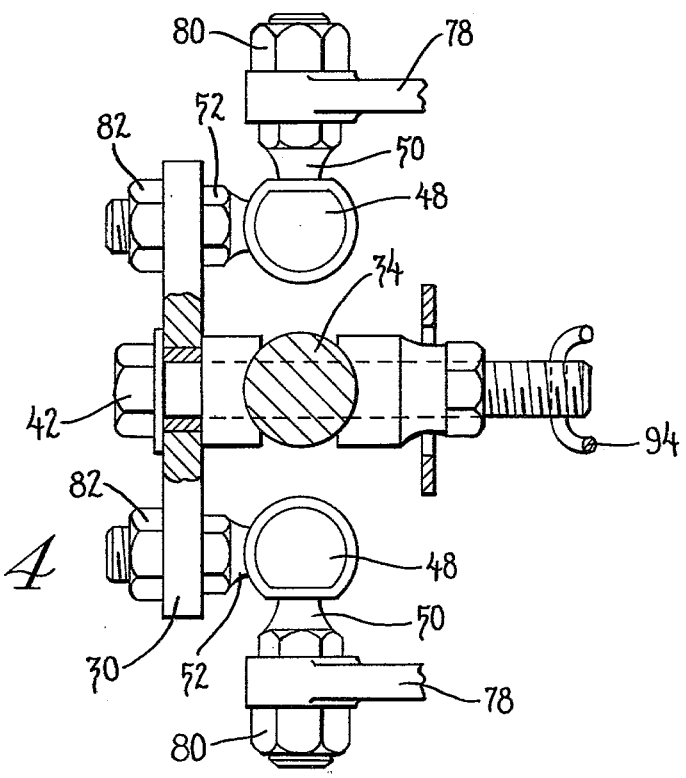
FIG. 4 is an enlarged partial sectional view taken generally along the line 4—4 in FIG. 2.

The present invention is particularly applicable to farm and industrial tractors where it is desirable to independently brake the left and right driving wheels. Such tractors and other related equipment will include supporting structure (indicated collectively at 10) upon which the various components will be mounted in fixed relationship to each other. Thus, a brake valve construction of the type referred to above and judicated generally at 12 will be mounted on the supporting structure 10, and in addition right and left brake pedals 14, 16 will be pivotally mounted on the supporting structure. To this end, the supporting structure may carry a transversely extending brake pivot rod 18 on which each of the brake pedals is pivotally mounted, the brake pedals being maintained in place on the rod 18 by retaining rings 20. the lower end of each of the brake pedals 14, 16 carries a pad 22 which may be engaged by the tractor operator's foot. A stop 24 in the form of a U-shaped bracket is secured to the supporting structure 10, the stop 24 normally being engaged by each of the brake pedals. To this end, each of the brake pedals 14, 16 has an arm 26 ridigly secured thereto in any conventional manner, the upper end of the arm 26 being engaged by a tension spring 28, the other end of which is secured to the supporting structure 10.

Each of the right and left brake pedals is interconnected with a yoke 30 by right and left brake pedal linkage assemblies indicated generally at 32. The yoke is in turn interconnected with one end of the shaft 34. The shaft 34 and poppet valves 38, 40 correspond to similar parts disclosed in the above mentioned patent and will function in the same manner. The ends of the yoke 30 are laterally spaced away from the poppet valves 38, 40, and to this end the yoke is mounted to one side of the shaft 34 on a bolt assembly 42 which passes through the outwardly projecting end of the shaft 34.

As the right and left brake pedal linkage assemblies 32 are substantially the same, only one will be described in detail. However, it should be appreciated that like reference numerals refer to like parts.

The linkage 32 which connects each of the brake pedals 14, 16 with the yoke 30 includes a push rod 44, a bell crank 46, a link 48, and means interconnecting the link 48 with the bell crank and the yoke, the interconnecting means being in the form of ball studs 50, 52, and the link 48 being the tubular intermediate portion of a ball joint assembly.

The rear end of the push rod 44 carries a clevis which is interconnected to the associated brake pedal by a pin 54. An intermediate portion of the push rod 44 passes through the support 10, the support carrying a dust boot assembly 56. The forward end of the push rod 44 passes through a trunnion 58 which is in turn supported by a bifurcated arm 60 of the bell crank 46. The trunnion is held in place on the bifurcated arm by fastening rings 62. The forward end of the push rod 44 is threaded and a rod bushing 64 is threaded thereon, the bushing passing through an aperture in the trunnion. A jam nut 68 maintains the rod bushing 64 in its desired location on the push rod 44. The rod bushing 64 is provided with an enlarged rear end portion or stop 70 and a spring washer 72 is disposed between the enlarged portion 70 and the trunnion. A retaining ring 74 which acts as a second stop is disposed on the other side of the trunnion. The trunnion can move between the stops 70, 74 but is normally maintained against the stop 74 by the spring washer 72.

The bell crank 46 is swingably mounted on a pivot shaft assembly 76 which is in turn mounted on the supporting structure 10. The bell crank 46 includes a second arm 78. The forward end of the second arm 78 has secured a ball stud 50 and nut 80, the ball end of the ball stud being received in one end of the tubular intermediate portion 48.

The upper end of the intermediate portion receives the ball end of the ball stud 52, the stud 52 being secured to the yoke by a nut 82. The upper end of the intermediate portion or link 48 is provided with a convex surface 84 which is adapted to contact the outer surface of the poppet valve 38 or 40. As can be seen from the various FIGS. it is maintained in alignment with the associated poppet valve by the associated mounting structure.

When the parts are assembled the brake pedals 14, 16 will be spring biased against the stop 24, and the nut 68 and bushing 64 will be adjusted to insure that small gaps are maintained between the upper end of the link 48 and the associated poppet valve 38, 40. This will insure that the poppet valves 38, 40 can shift away from their seats during the initial operation of the brake linkage.

In operation, if the operator desires to stop the left wheel only, he will step on the left brake pedal. This will cause the push rod 44 of the left brake linkage 32 to move in a forward direction, the bell crank 46 to rotate in a counterclockwise direction, and the ball joint assembly 48, 50, 52 to be moved in a downwardly direction. This will in turn cause the yoke 30 to rock about the shaft 42 causing upward movement of the ball joint assembly for the right brake linkage, such upward movement causing clockwise movement of the associated bell crank 46. As the bifurcated arm 60 moves rearwardly the spring washer 72 will be compressed as the right push rod cannot move rearwardly as the right brake pedal is against the stop 24.

After the parts have been moved the initial amount set forth above, which amount corresponds to the brake pedal free play, further downward movement of the pedal will cause the yoke to pivot about the ball 52 in the right brake linkage which will in turn cause the shaft 34 be withdrawn from the valve body 36. This will now divert brake fluid from the outlet 86 to the left brake line 88.

It should be noted at this point that as the shaft 34 is moved outwardly when only one brake pedal is being stepped upon that one of the poppets will be held in its closed position by the intermediate link 48 in the linkage for the other brake pedal. Thus, when the left brake pedal is stepped upon fluid cannot flow to the right brake line 90 from the supply line 92 as the right poppet is being held in its closed position by the associated link 48. However, fluid may flow from the supply to the left brake line 88.

When both brake pedals are stepped upon simultaneously, the yoke 30 will be shifted downwardly away from both poppets 38, 40 permitting operation of both brakes.

When the operator releases one or both of the brake pedals the parts will be returned to their normal position by springs 28 and 94.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

I claim:

1. Operating structure for a brake valve construction mounted upon a support, the brake valve construction including a valve body, a normally retracted shaft one end of which is carried by the valve body, and a pair of valves disposed to differing sides of said shaft; said operating structure comprising:
   a pair of brake pedals pivotally mounted on said support;
   a pair of push rods each of which is interconnected with an associated brake pedal;
   a pair of bell cranks pivotally mounted upon said support, the bell cranks each having first and second arms, the first arm being interconnected with one of the push rods;
   a pair of links each having one end adapted to bear against one of said pair of valves;
   means interconnecting the other end of each of the links with the second arm of an associated bell crank; and
   a yoke the ends of which are connected to the links, the intermediate portion of the yoke being interconnected to said shaft.

2. The operating structure for a brake valve construction as set forth in claim 1 further characterized by the provision of a stop carried by said support, and means operable to bias said pair of brake pedals rearwardly against said stop.

3. The operating structure for a brake valve construction as set forth in claim 1 wherein the first arm of each of said bell cranks is bifurcated and carries a trunnion which receives one end of the interconnected push rod for limited sliding movement.

4. The operating structure for a brake valve construction as set forth in claim 3 wherein a pair of stops are mounted on said push rod to either side of said trunnion, and further characterized by the provision of spring means which normally biases said trunnion against one of said stops.

5. The operating structure for a brake valve construction as set forth in claim 4 wherein said stops are adjustably mounted on said one end of said push rod.

6. The operating structure for a brake valve construction as set forth in claim 1 wherein each of said links 48 is the intermediate tubular portion of a ball joint construction, the interconnected means for connecting the ends of the intermediate portion with the bell cranks being ball studs and nuts, 80, 82, said ball studs and nuts also connecting the ends of the yoke to the links.

7. Operating structure for a brake valve construction mounted upon a support, the brake valve construction including a valve body, a normally retracted shaft the upper end of which is carried by the valve body, and right and left opposed poppet valves disposed to either side of said shaft; said operating structure comprising:
   right and left brake pedals pivotally mounted at their upper ends on said support;
   a brake pedal stop carried by said support;
   means operable to bias said right and left brake pedals rearwardly against said stop;
   right and left push rods one end of each being connected to an associated brake pedal;
   right and left bell cranks each being pivotally mounted upon said support, and each of said bell cranks having a first bifurcated arm and a second arm;
   right and left trunnions carried by the first arms of the right and left bell cranks, said trunnions receiving the right and left push rods;

right and left ball joint assemblies each of which include a tubular intermediate portion having an upper end adapted to bear against an associated poppet valve, and first and second ball studs, the first ball stud interconnecting the other end of the tubular intermediate portion with the second arm of the associated bell crank, and the second ball stud being mounted on an upper portion of the tubular intermediate portion;

a yoke the ends of which are connected to the second ball studs of the right and left ball joint assemblies; and pivot pin means carried by the lower end of the normally retracted shaft, said pivot pin means mounting an intermediate portion of said yoke to one end portion of the shaft with the intermediate portion of the ball joint assembly in line with said poppet valves.

8. The operating structure for a brake valve construction as set forth in claim 7 wherein said push rods are provided with adjustable stop means to either side of said trunnion, and further characterized by the provision of spring means which normally bias said trunnion against one of said stops.

9. The operating structure for a brake valve construction as set forth in claim 7 wherein the upper end of each of the tubular intermediate portions is provided with a convex surface.

* * * * *